Oct. 14, 1958  A. O. JANSSON  2,855,648
FASTENING DEVICE
Filed March 31, 1958
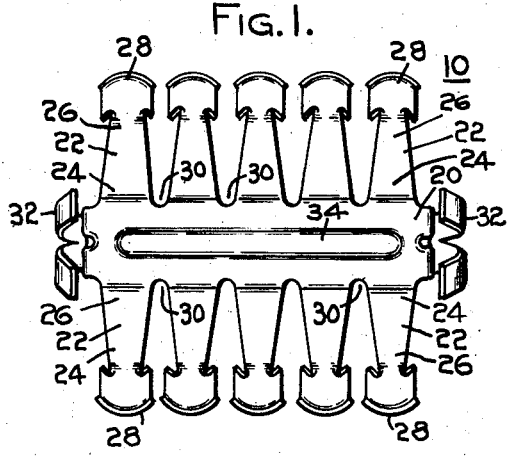
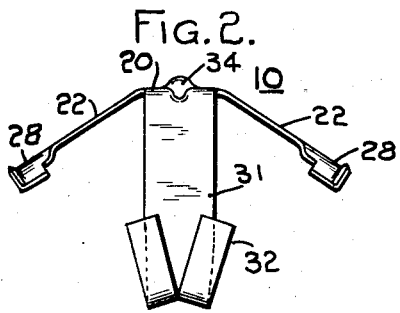
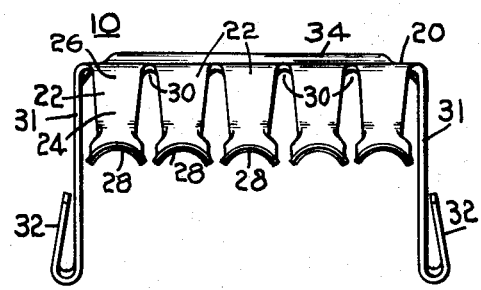
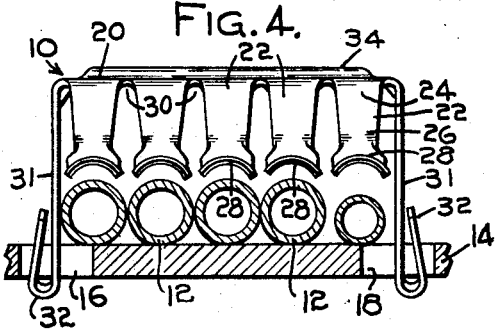
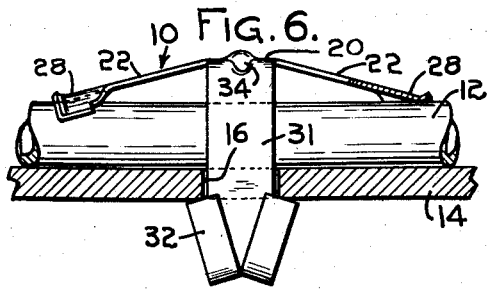
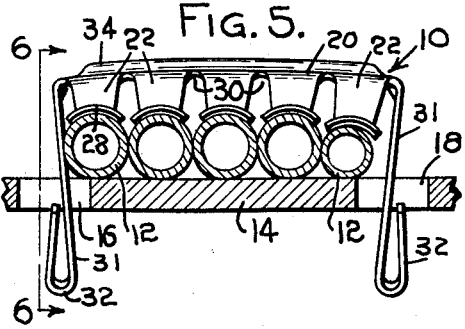
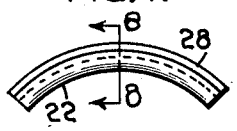
INVENTOR:
ARNOLD O. JANSSON,
By Walter P. Jones
ATTORNEY.

United States Patent Office 2,855,648
Patented Oct. 14, 1958

2,855,648
FASTENING DEVICE

Arnold O. Jansson, Arlington, Mass., assignor to United-Carr Fastener Corporation, Cambridge, Mass., a corporation of Delaware Application March 31, 1958, Serial No. 725,298

4 Claims. (Cl. 24—81)

This invention relates to a fastening device and in particular to a tubing clip adapted to secure a plurality of tubes or the like to a panel.

In the manufacture and assembly of automobiles it has been customary to group wiring and tubes in a wire or tube harness. However, with the advent of air conditioning and air suspension for the automobile, a certain amount of semi-rigid tubing has been employed which cannot be firmly retained in a harness type fastener. Hence it is desirable to provide a fastener adapted to secure a plurality of tubes in side by side relation firmly to a panel.

The object of this invention is to provide a fastener for attaching a plurality of tubes in side by side relation to a panel.

A further object of the invention is to provide a fastener for attaching tubes of varying diameter in side by side relation to a panel.

Another object of this invention is to provide a tubing clip adapted for blind attachment to a panel.

Other objects of this invention will, in part, be obvious, and will, in part, appear hereinafter.

In the drawing:

Fig. 1 is a plan view of the fastener;

Fig. 2 is a view in end elevation from the left of Fig. 1;

Fig. 3 is a view in front elevation of the fastener shown in Fig. 1;

Fig. 4 is a view similar to Fig. 3 with fastener partly assembled in the plate;

Fig. 5 is a view similar to Fig. 4 with fastener assembled in the plate;

Fig. 6 is a section taken on line 6—6 of Fig. 5;

Fig. 7 is an end view of the finger;

Fig. 8 is a section taken on line 8—8 of Fig. 7.

Referring to the drawing, there is illustrated a fastening device 10 which is particularly adapted for attaching a series of tubes 12 or the like to a support panel 14. In the illustrated embodiment the support panel 14 is provided with apertures 16 and 18.

The fastener 10 is formed from a single piece of resilient material and comprises a base 20 having longitudinally spaced arms 22 extending laterally outward from opposite sides of the base. The arms 22 are inclined downwardly from the plane of the base and are tapered having a greater width 24 adjacent the base than the width 26 near the distal end 28. The arms 22 are longitudinally spaced from each other by bifurcations 30 and provide for individual flexing action of each pair of opposed arms. The distal end portions 28 are arcuately flared presenting a larger area than the rest of the arm and more adapted to conform to the cylindrical configuration of a tube to be inserted thereunder. The attaching legs 31 are formed integral with the base 20 and extend downwardly from the ends thereof substantially perpendicular to the base and are provided with a form of panel engaging means 32. In the illustrated embodiments of the device, I have shown a type of panel engaging means such as those of the Bedford Patent No. 2,666,968 but any type of snap fasteners could readily be adapted for use to attach the clip to a panel.

Referring to Fig. 4, there is shown the fastener 10 in superimposed position over a series of tubes 12 and having the panel engaging means 32 located within the apertures 16 and 18. The arms 22 are not under tension and are aligned with the longitudinal axis of the tubes. The completed application of the fastener is shown in Fig. 5, where downward pressure has been exerted on the base 20 so that the panel engaging means 32 pass through the apertures 16 and 18 and lock into engagement with the under surface of the panel 14. As a consequence of the lowering of the fastener, the arms 22 frictionally engage the tubes 12 and diverge outwardly sliding along the axis of the tubes and maintaining a resilient tension. By inclining the distal end portions 28 of the arm 22 upwardly, the arms will slide along the surface of the tubes and prevent any biting engagement therewith.

As an additional strengthening feature, a rib 34 has been formed along the medial surface of the base 20 which resists deformation of the base when subjected to the flexing action of the arms.

It will thus be obvious to anyone skilled in the art that this fastener could be readily adapted to conform to a wide range of tube diameters in a single installation.

Since certain other obvious modifications may be made in this device without departing from the scope of the invention, it is intended that all matters contained herein be interpreted in an illustrative and not in a limiting sense.

I claim:

1. A fastening device formed from a single piece of resilient material comprising a base portion having a series of longitudinally spaced resilient arms extending laterally from opposite side edges, said arms inclined downwardly out of the plane of said base, each of said arms terminating in arcuately flared distal end portions adapted for frictional engagement with tube members disposed transversely to said base portion and panel engaging means extending downward from the end portion of said base.

2. A fastening device for securing a plurality of tubes or the like to a panel comprising a base member having a series of longitudinally spaced opposed resilient arms extending laterally from the side edges and inclined downwardly out of the plane of the base, said arms terminating in arcuately flared distal end portions adapted to frictionally engage tube members longitudinally positioned between the opposed arms, the end portions of said base member bent downward at substantially right angles to said base and terminating in panel engaging means, said arm portions adapted to flex upwardly toward the plane of the base and resiliently retain the tube members against the panel.

3. A fastening device for securing a plurality of tubes or the like to a panel as set forth in claim 2 in which the arcuately flared distal end portions are curved upward to minimize sharp corners at the junction of said flared distal end portions with the tube member.

4. A fastening device as defined in claim 2 in which the medial portion of said base member is ribbed upwardly along the longitudinal axis.

References Cited in the file of this patent

UNITED STATES PATENTS

| 751,354 | Smart | Feb. 2, 1904 |
| 1,981,973 | Tinnerman | Nov. 27, 1934 |
| 2,560,486 | Shears | July 10, 1951 |

FOREIGN PATENTS

| 161,782 | Great Britain | Apr. 21, 1921 |